United States Patent
Fujiwara

(10) Patent No.: US 6,567,674 B1
(45) Date of Patent: May 20, 2003

(54) RADIO INFORMATION TERMINAL CAPABLE OF FACILITATING ON-LINE OPERATION BY A PORTABLE COMPUTER

(75) Inventor: Ryuhei Fujiwara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/472,778

(22) Filed: Dec. 27, 1999

(30) Foreign Application Priority Data

Dec. 25, 1998 (JP) .......................................... 10-371387

(51) Int. Cl.$^7$ .............................................. H04L 29/06
(52) U.S. Cl. ........................ 455/557; 455/556; 455/575
(58) Field of Search ................................ 455/557, 550, 455/556, 558, 575, 90

(56) References Cited

U.S. PATENT DOCUMENTS

| | | | | |
|---|---|---|---|---|
| 5,628,055 A | * | 5/1997 | Stein .......................... | 455/575 |
| 5,873,045 A | * | 2/1999 | Lee et al. .................... | 455/550 |
| 5,974,085 A | * | 10/1999 | Smith .......................... | 375/222 |
| 5,983,073 A | * | 11/1999 | Ditzik ........................ | 455/11.1 |
| 6,427,078 B1 | * | 7/2002 | Wilska et al. ................ | 455/550 |

* cited by examiner

Primary Examiner—Daniel Hunter
Assistant Examiner—Pablo N Tran
(74) Attorney, Agent, or Firm—Scully, Scott, Murphy & Presser

(57) ABSTRACT

A radio information terminal comprises a radio unit, functioning as a proxy server to a portable computer when it is connected to the portable computer and unable to receive a control radio wave from a base station, and synchronizing information received from the portable computer with information of an original server via the base station when it comes to receive the control radio wave from the base station.

3 Claims, 3 Drawing Sheets

RADIO INFORMATION TERMINAL CAPABLE OF FACILITATING ON-LINE OPERATION BY A PORTABLE COMPUTER

BACKGROUND OF THE INVENTION

The present invention relates to a radio information terminal connectable to a portable personal computer.

Portable telephones are used widely and voice communication is now available at anytime and everywhere. On the other hand, the portable computer (PC) is made thinner, lighter and easier to carry, increasing the demand of online operation everywhere using radio data communication. To meet such demand, a radio information terminal has been commercialized, to function as a modem for performing the radio data communication, when the terminal is connected to a PC through a general use interface such as PCMCIA, and to function as portable telephone, when the terminal is disconnected from the PC.

Now, the PC is a man-operated terminal requiring a certain ergonomically determined volume and a place for online operation is restricted, in general, to the inside of a building or the like. On the other hand, as a radio wave hardly reaches into the building, it is difficult to achieve real time communication with the radio information terminal, as assured by a cable modem.

SUMMARY OF THE INVENTION

It is therefore an object of the present invention to facilitate online operation by a portable computer.

Other objects of the present invention will become clear as the description proceeds.

According to an aspect of the resent invention, there is provided an improved radio information terminal comprising: a radio unit, which when connected to a portable computer, functions as a proxy server to the portable computer under the condition that the radio unit is unable to receive a control radio wave from a base station, and synchronizes primary information received from the portable computer with secondary information of an original server received via the base station under the condition that the radio unit is able to receive the control radio wave from the base station.

The portable computer or an operation unit may be connected to the radio unit, and the radio unit functions as a portable telephone when the operation unit is connected to the radio unit.

The radio unit may be supplied with power from the portable computer when the portable computer is connected to the radio unit, and the radio unit may be supplied with power from the operation unit when the operation unit is connected to the radio unit.

DETAILED DESCRIPTION OF THE PREFERRED EMBODIMENT

Figure 1:
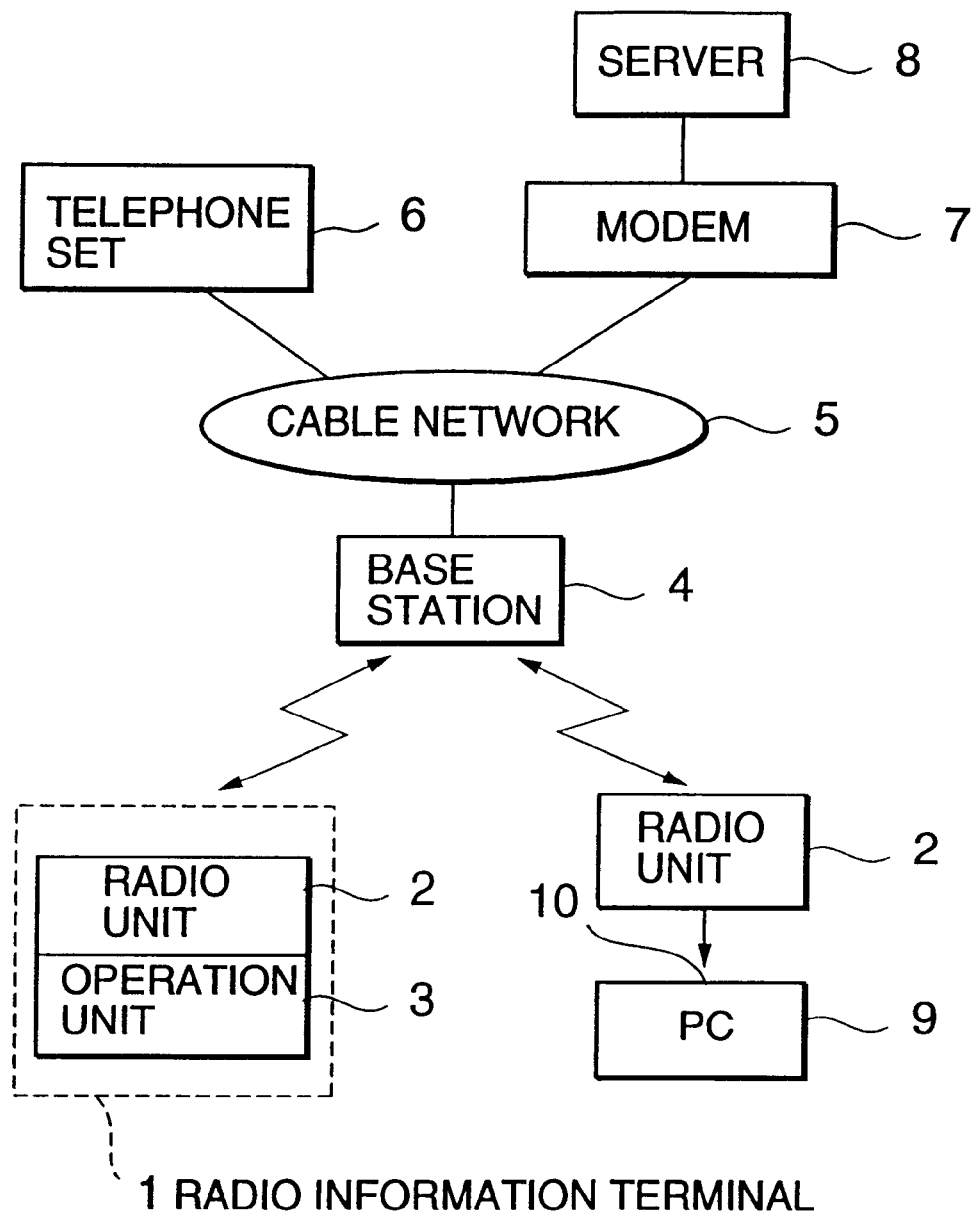
FIG. 1 is a system composition diagram of a communication system to which a radio information terminal of a preferred embodiment of the present invention is applied.
Figure 2:
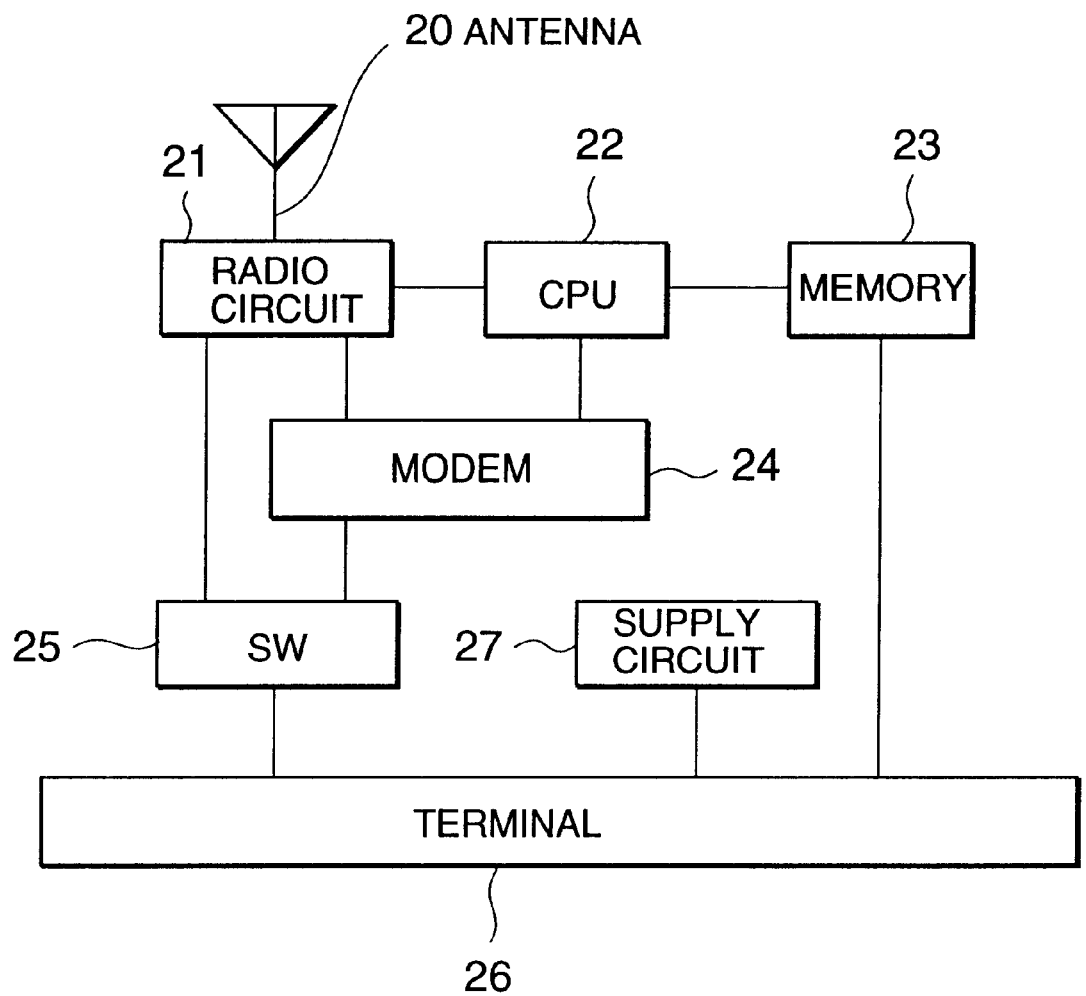
FIG. 2 is a block diagram for showing the functional composition of the radio unit in the preferred embodiment of the present invention.
Figure 3:
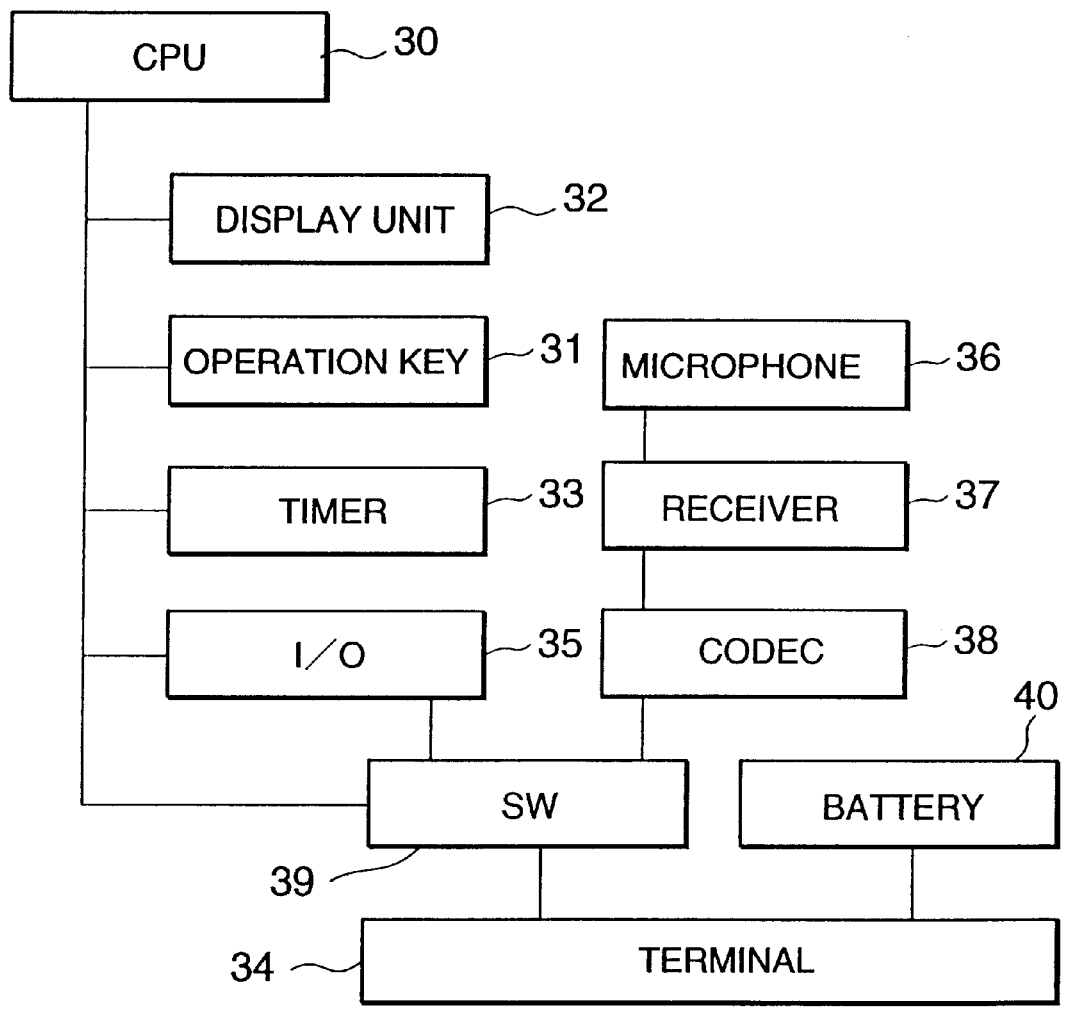
FIG. 3 is a block diagram for showing the functional composition of the operation unit in the preferred embodiment of the present invention.

Now, referring to FIGS. 1 through 3, description will proceed to a radio information terminal according to a preferred embodiment of the present invention.

FIG. 1 is a system composition diagram of a communication system to which a radio information terminal 1 of the present embodiment is applied. As shown in this diagram, this radio information terminal 1 comprises a radio unit 2 and an operation unit 3 and is composed to allow the use of the radio unit 2 and the operation unit 3 separately. In a state where the radio unit 2 and the operation unit 3 are combined, the radio information terminal 1 communicates by radio with a base station 4, communicates by voice with a telephone set 6 via a cable network 5 to which the base station 4 is connected, and moreover, performs the data communication with the original server 8 connected to the cable network 5 via a MODEM 7, through the base station 4 and the cable network 5.

On the other hand, when the radio unit 2 is detached from the operation unit 3, the radio unit 2 is composed to allow the connection to a PCMCI slot 10 of a portable personal computer (PC) 9. The PC 9 has a function to perform data communication with the original server 8 via the radio unit 2, base station 4, cable network 5 and MODEM 7, and also has a function to communicate only with the radio unit 2 without radio communication.

FIG. 2 is a block diagram showing the functional composition of the radio unit 2. As shown in this diagram, the radio unit 2 comprises an antenna 20 for radio wave transmission/reception between the base station 4, a radio circuit 21 connected to the antenna, a CPU 22 for controlling the control of the radio circuit 21 the communication with the externally connected PC 9, a memory 23 for string a control program to be executed by the CPU 22 or the like, a MODEM 24 for securing the data transmission reliability including the retransmission control or the others in opposition to a general use MODEM, a changeover switch 25 to be controlled by the CPU 22 and an input/output terminal 26 taking interface with the external devices.

Here, the radio unit 2 is composed to function as a proxy server based on the control program, when it comes to a state in which it is unable receive a control radio wave transmitted from the base station 4. In other words, the radio unit 2 functions as a client to the original server 8 and as the proxy server to the PC 9, and the memory 23 stores information equivalent to the original server 8.

Besides, a supply circuit 27 of the radio unit 2 is supplied with power from the PC 9 when the radio unit 2 is detached from the operation unit 3 and joined with the PC 9, and from the operation unit 3 when the radio unit 2 is combined with the operation unit 3, and at the same time, in the case when the radio unit 2 stands alone, the data stored in the memory 23 is held by a supply backup means not shown.

FIG. 3 is a block diagram of the functional composition of the operation unit 3. The operation unit 3 comprises an operation key 31 for inputting the dial number or other operations, a display unit 32 for displaying the same dial number or radio state, a timer 33 for clocking the absolute hour or interval, an input/output terminal 34 to be joined to the input/output terminal 26 of the radio unit 2, an input/output port 35 controlled by a CPU 30, a microphone 36 to input voice, a receiver 37 to output voice, a CODEC 38 to convert a voice analog signal into a digital signal, a changeover switch 39 controlled by the CPU 30, a battery 40 to supply the respective units with power, and others.

Next, the operation of thus composed radio information terminal 1 will be described in detail.

First of all, the case wherein this radio information terminal 1 is used as portable telephone will be described. In this case, the radio unit 2 and the operation unit 3 are combined, through junction of the input/output terminal 26 of the radio unit 2 and the input/output terminal 34 of the operation unit 3. On the other hand, the supply circuit 27 of the radio unit 2 is supplied with power from the battery 40 via the input/output terminals 26, 34.

In this state, the telephone number of the destination telephone set 6, which is input from the operation key 31 of the operation unit 3, is seized into the CPU 30 to be indicated on the display unit 32. After having confirmed this telephone number, when the user of this radio information terminal pushes down the off-hook button among the operation keys 31, and upon the detection of the same, the CPU 30 operates the input/output terminal 35 to write the telephone number and, at the same time, to also write the communication connection demand into the memory 23 of the radio unit 2 from the input/output terminal 34 via the input/output terminal 26.

Then, upon the detection of the writing of the communication connection demand into the memory 23, the CPU 22 of the radio unit 2 demands that the base station 4 establish the communication with the telephone number written in the memory 23 by controlling a radio circuit 21, calls and connects a corresponding telephone set 6 via the cable network 5. Moreover, the CPU 22 of the radio unit 2 directly connects a serial signal terminal of the input/output terminal 26 and an input/output signal line of the radio circuit 21, by controlling the switch 25 according to the response signal announced by the base station 4 based on the response of the telephone set 6.

At the same time, the CPU 22 writes the response signal into the memory 23. Upon its detection through the input/output terminal 35, the CPU 30 of the operation unit 3 controls the switch 39 to connect the serial signal terminal of the input/output terminal 34 and the CODEC 38. As the result, the voice communication starts, because a microphone 36 and a receiver 37 are connected, to the CODEC 38. By the way, when a communication is to be terminated or when a call is received, and in other cases, a control signal is sent/received via the memory 23 of the radio unit 2, and a communication channel is controlled through the cooperation of the CPU 22 and the CPU 30 as mentioned above.

Next, a case where the radio unit 2 is connected to a PC 9 and in communication with the PC 9 will be described. In this case, as the radio unit 2 is connected to the PC 9 and is indoors, the radio unit 2 cannot receive the control radio wave emitted periodically by the base station 4. Consequently, the communication with the base station is in a disabled state.

In such a state, the radio unit 2 is disconnected from the operation unit 3, and the input/output terminal 26 is connected to a PCMCIA slot 10 of the PC 9. Then, the PC 9 demands the thus connected radio unit 2 to connect to the original server 8 using a special telephone number (for instance, 999) set in the radio unit 2 beforehand, and the CPU 22 of the radio unit 2 judges that it should operate as proxy server from the special telephone number.

Thereafter, the radio unit 2 processes PPP (Point To Point), TCP/IP or other protocols forming a link in the position of a proxy server having the PC 9 as client. For example, if the PC 9 demands a mail readout by POP protocol, the radio unit 2 reads out mail information stored in the memory 23 and hands it to the PC 9. This mail information has been acquired through the communication with the original server 8, when the radio unit 2 was able to communicate with the base station 4 as mentioned below, and stored in the memory 23.

Further, when the radio unit 2 and the operation unit 3 are separated, the radio unit 2 is supplied with power form the PCMCIA slot 10 of the externally connected PC 9. Moreover, the content of the memory 23 is maintained even when the radio unit is not supplied with power, by using a nonvolatile memory, or by employing a backup battery.

In turn, a case when a radio information terminal 1, which combines the radio unit 2 and the operation unit 3, performs data communication with an original server 8 will be described. In this case, the radio unit 2 is used as a part of the radio information terminal 1, and is often submitted for the outdoor use. In a state when the radio unit 2 is combined with the operation unit 3, the radio unit 2 receives the control signal emitted periodically by the base station, and transmits as a client to the original server 8, the information stored in the memory 23 during its operation as the proxy server.

Further, the call time, the original server 8 telephone number, or others are supposed to be written into {from} the memory 23 of the radio unit 2 beforehand by the PC 9. On the other hand, in the radio unit 2, the CPU 22 is supposed to periodically write into the memory 23 the state of the control signal from the base station 4 received permanently by the radio circuit 21.

In this case, if the call time written in the memory of the of the radio unit 2 agrees with the time read out from the timer, the CPU 30 of the operation unit 3 will read out the control radio wave state written also in the memory 23, determine if the communication is enabled or not, seize the telephone number of the original sever 8 written also in the memory 23, and write the telephone number with the data communication connection demand into the memory 23 of the radio unit 2 through the input/output terminals 34 and 26 by controlling the input/output port 35.

Upon the detection of the data communication connection demand written into the memory 23, the CPU 22 of the radio unit 2 will demand that the base station 4 establish the data communication with the telephone number written in the memory 23 by controlling the radio circuit 21, and that the base station 4 call up and connect to the MODEM 7 linked to a corresponding original server 8 via a cable network 5.

Thereupon, the CPU 22 of the radio unit 2 controls the switch 25 based on the response signal announced by the base station 4 for the response of the MODEM 7, connects the serial signal terminal of the input/output terminal 26 and the input/output signal line of the radio circuit 21 via the MODEM 24 and, at the same time, writes the response signal into the memory 23.

Upon its detection via input/output port 35, the CPU 30 of the operation unit 3 controls the switch 39 to directly connect the serial signal terminal of the input/output terminal 34 and the CPU 30. Thereupon, the CPU 30 starts to communicate with the original server 8, reads out mails using a protocol such as POP and writes into the memory 23 through the input/output port 35.

When the CPU 30 finishes seizing all unread mails stored in the original server 8, it directs the CPU 22 to disconnect the line through the memory 23 of the radio unit 2. Then, it displays that it has seized mails on the display unit 32. Further, the CPU 30 reads out the seized mails from the memory 23 of the radio unit 2 on the display unit 32 or deletes them.

Finally, a case when the radio unit 2 is used for the direct data communication between the PC 9 and the original server 8 will be described. This case concerns a usage mode that is enabled when the radio unit 2 is connected to the PC 9 in a state such as outdoors or the like where it can receive the control radio wave of the base station 4. In this case, the radio unit 2 is detached from the operation unit 3 and is connected to the PCMCIA slot of the PC 9. There, the PC 9 operates the radio unit 2 as a general use MODEM.

In this state, the CPU 22 of the radio unit 2 connects the serial signal terminal of the input/output terminal 26 and the input/output signal line of the radio circuit 21 via the MODEM 24, by controlling the switch 25. Then, the CPU 22 obtains information required for the communication control such as connection demand or connection destination telephone number from the PC 9 via the MODEM 24. The PC 9 writes the connection demand including the telephone number of the MODEM 7 connected to the original server 8 into the memory 23 of the radio unit 2.

When the CPU 22 detects that the communication connection demand is written in the memory 23, it controls the radio unit 2 to demand that the base station 4 establish the communication with the telephone number written in the memory 23, calls up and connects a corresponding MODEM 7 via the cable network 5. Then, the CPU 22 connects the MODEM 24 between the serial signal terminal of the input/output terminal 26 and the input/output signal line of the radio circuit 21 by controlling the switch 25, based on the response signal announced by the base station 4 according to the response of the MODEM 7. Thereafter, the PC 9 starts to communicate with the original server 8 via the MODEM 7 of the communication interlocutor.

According to this embodiment, the radio unit 2 functions as proxy server to the PC 9 when it is out of the radio wave reach, and the radio unit 2 communicates with the original server 8 via MODEM 7 when it is within the radio wave range. On the other hand, in a state when the radio unit 2 is disconnected from the PC 9 and combined with the operation unit 3, as it presents such size and use equivalent to a portable telephone, it will synchronize data automatically with the original server 8, when it is set in a place where the radio wave conditions are appropriate for the communication as its holder carries it around.

Therefore, as the radio unit 2 always obtains the latest information from the original server 8, it can supply the PC 9 with this latest information, when it functions as proxy server. Moreover, concerning the communication protocol between the radio unit 2 and the PC 9, as communication protocols similar to those for the communication between the original server 8 and the PC 9 can be used, it is not necessary to modify the communication protocol especially on the PC 9 side.

As described above, according to the radio information terminal in accordance with the preferred embodiment of the present invention, the following effects can be expected.

First, a radio unit functions as proxy server to a portable computer when it is connected to the portable computer and unable to receive the control radio wave from a base station, and the radio synchronizes the information received from the portable computer with the information of a original server via the base station when the radio unit comes to receive the control radio wave of the base station. The portable computer information stored when the radio unit was functioning as proxy server is synchronized with the original server when the radio unit comes to receive the control radio wave of the base station. Therefore, even a portable computer which may be used in an environment, such as indoors or the like, where the control radio wave of the base station can not be received, can perform a false online operation.

Second, because a portable computer or an operation unit can be connected to the radio unit, and the radio unit is so composed as to function as portable telephone when the operation unit is connected, the radio unit can also be used as portable telephone.

Third, as the radio unit is supplied with power from the portable computer when the portable computer is connected, and is supplied with power from the operation unit when the operation unit is connected, a memory backup battery or an equivalent may well be provided for maintaining the information, allowing to downsize the equipment composition and improve its portability.

What is claimed is:

1. A radio information terminal comprising:

a radio unit, which when connected to a portable computer, functions as a proxy server to said portable computer under the condition that the radio unit is unable to receive a control radio wave from a base station, and synchronizes primary information received from said portable computer with secondary information of an original server received via said base station under the condition that the radio unit is able to receive said control radio wave from said base station.

2. The radio information terminal as claimed in claim 1, wherein said radio unit functions as a portable telephone when connected to an operation unit instead of said portable computer.

3. The radio information terminal as claimed in claim 2, wherein said portable computer supplies power to said radio unit when said portable computer is connected to said radio unit, and said operation unit supplies power to said radio unit when said operation unit is connected to said radio unit.

* * * * *